United States Patent
Av et al.

(10) Patent No.: US 12,216,551 B2
(45) Date of Patent: Feb. 4, 2025

(54) VULNERABILITY TAGGING FOR KUBERNETES WORKLOADS IN A DATA PROTECTION SYSTEM

(71) Applicant: Dell Products L.P., Round Rock, TX (US)

(72) Inventors: Mahesh Reddy Av, Bangalore (IN); Avinash Kumar, Patna (IN); Terry O'Callaghan, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/329,313

(22) Filed: Jun. 5, 2023

(65) Prior Publication Data
US 2024/0403170 A1 Dec. 5, 2024

(51) Int. Cl.
*G06F 11/14* (2006.01)
*H04L 9/40* (2022.01)

(52) U.S. Cl.
CPC ...... *G06F 11/1464* (2013.01); *G06F 11/1453* (2013.01); *H04L 63/1433* (2013.01); *G06F 2201/84* (2013.01)

(58) Field of Classification Search
CPC ............... G06F 11/1464; G06F 11/145; G06F 2201/843; H04L 63/1433
See application file for complete search history.

(56) References Cited

U.S. PATENT DOCUMENTS

| | | | |
|---|---|---|---|
| 11,853,330 B1* | 12/2023 | Bannon | G06F 3/0482 |
| 2021/0271565 A1* | 9/2021 | Bhavanarushi | G06F 9/45558 |
| 2021/0365290 A1* | 11/2021 | Zhang | G06F 9/547 |
| 2022/0206902 A1* | 6/2022 | Hoang | G06F 9/485 |
| 2022/0230083 A1* | 7/2022 | Vishwakarma | G06F 3/0608 |
| 2023/0011588 A1* | 1/2023 | Parry | G06F 16/24573 |
| 2023/0106269 A1* | 4/2023 | Mitkar | G06F 11/1464 707/654 |

* cited by examiner

*Primary Examiner* — Dangelino N Gortayo
(74) *Attorney, Agent, or Firm* — Staniford Tomita LLP

(57) ABSTRACT

A vulnerability tagging process helps prioritize backups of datasets in a network by monitoring events that affect containers in the network. The monitored events are processed by an AI-based event analyzer to characterize each event in terms of a potential for destruction or damage to the data by each event. A vulnerability measure is calculated as the product of the number of occurrences of each event based on the severity associated with each event. Once the events are analyzed and the vulnerability scores are calculated, the scores are tagged on each workload. The vulnerability tags can then be utilized by the backup server to modify protection policies and/or prioritize backup schedules for the container workloads.

20 Claims, 7 Drawing Sheets

VULNERABILITY TAGGING FOR KUBERNETES WORKLOADS IN A DATA PROTECTION SYSTEM

TECHNICAL FIELD

Embodiments are generally directed to containerized database data, and more specifically to data vulnerability tagging for Kubernetes workloads in a data protection system.

BACKGROUND

Containerization technology has been developed as a lightweight alternative to full machine virtualization that involves encapsulating an application in a container with its own operating environment. This provides many of the benefits of loading an application onto a virtual machine (VM), as the application can be run on any suitable physical machine without any concern about dependencies. Containerization has gained recent prominence with the open-source Docker, in which containers are deployed as portable, self-sufficient containers that can run on everything from physical computers to VMs, bare-metal servers, cloud clusters, and so on. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software. Because resources are shared in this way, application containers can be created that place less strain on the overall resources available.

The Kubernetes system is a popular container management platform for managing containerized applications in a clustered environment and provide ways of managing related, distributed components across varied infrastructures. Database applications on Kubernetes clusters come in a wide range of configurations and ranges, such as from standalone deployment to single partition cluster to multiple partition clusters.

Kubernetes workload protection systems generally emphasize enterprise-level deployments. However, in the face of increasing threats to data safety, it is important for data protection schemes to specifically analyze the threat level to these workloads. In legacy backup applications, there is no mechanism to monitor and analyze the risk associated with each container in a Kubernetes workload. Such systems generally prioritize backup and protection policies based only upon a consideration of the type of application running on the host data source. This represents a shortcoming in achieving more effective ways of backing up data based on the risk associated with a containerized workload.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Data Domain, Data Domain Restorer, and PowerProtect are trademarks of DellEMC Inc.

BRIEF SUMMARY OF EMBODIMENTS

Embodiments are directed to a vulnerability tagging process that helps prioritize backups of datasets in a network by monitoring events that affect containers in the network. The monitored events are processed by an AI-based event analyzer to characterize each event in terms of a potential for destruction or damage to the data by each event. A vulnerability measure is calculated as the product of the number of occurrences of each event based on the severity associated with each event. Once the events are analyzed and the vulnerability scores are calculated, the scores are tagged on each workload. The vulnerability tags can then be utilized by the backup server to modify protection policies and/or prioritize backup schedules for the container workloads.

Embodiments are further directed to a system and method that utilizes AI/ML methods to analyze events from each of the container through Kubernetes and assign a corresponding weighting value to each of the events. Some or all of the events may be actions that pose a threat to the data through either malicious behavior or compromises to the system integrity. The process calculates the number of occurrences of an event, and associates a vulnerability tag to a particular container to ensure that the workloads are backed up dynamically and in advance of any possible problem based upon these tags. Such a system provides marked benefits over present systems that prioritize backups based only on application information or set policies.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
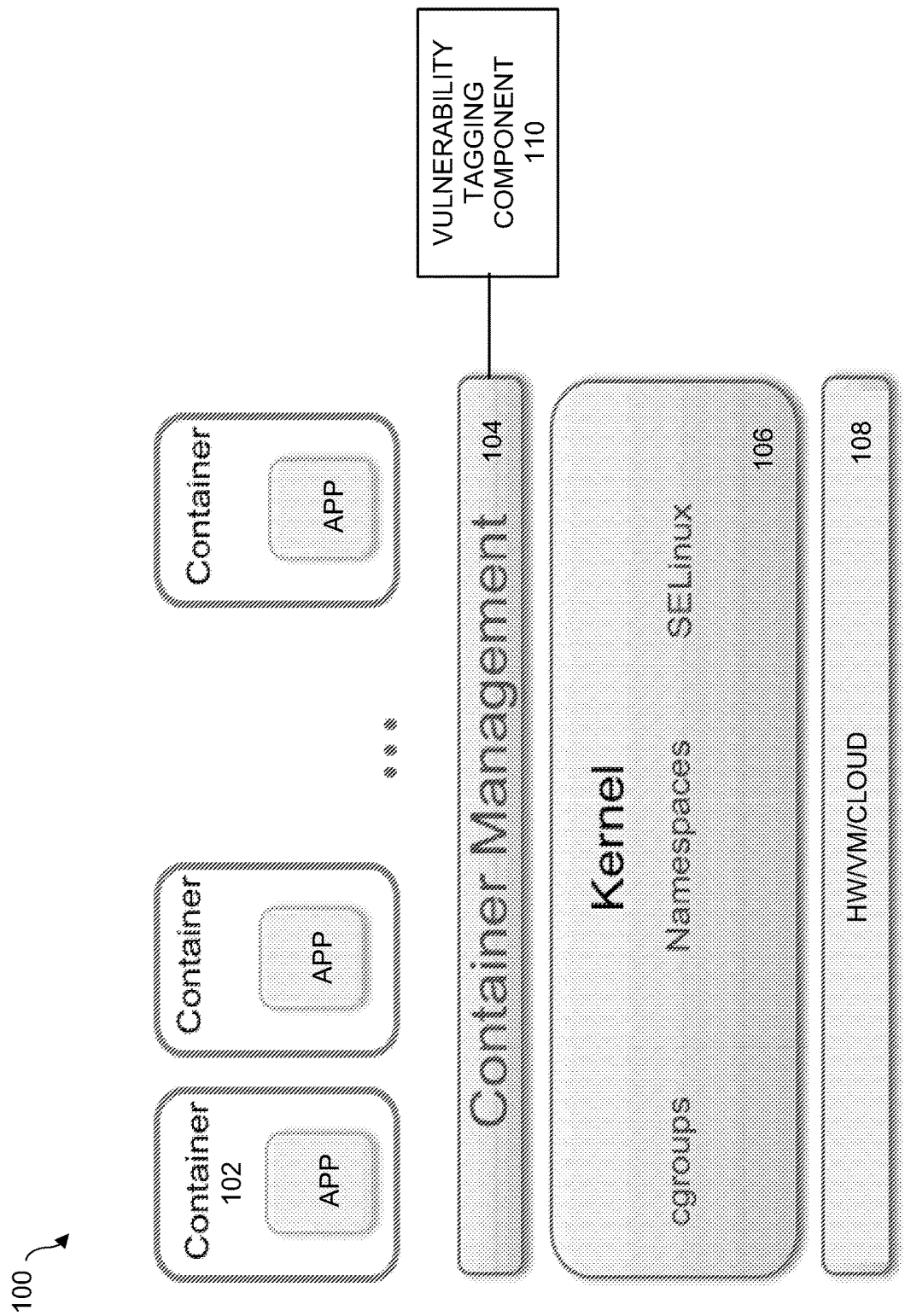
FIG. 1 is a diagram of a container management system implementing an AI-based vulnerability tagging method, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a system and method that utilizes artificial intelligence (AI) to analyze events from each of the container through Kubernetes and assign a corresponding weighting value to each of the events. Some or all of the events may be actions that pose a threat to the data through either malicious behavior or compromises to the system integrity. The process calculates the number of occurrences of an event, and associates a vulnerability tag to a particular container to ensure that the workloads are backed up dynamically and in advance of any possible problem based upon these tags. Such a system provides marked benefits over present systems that prioritize backups based only on application information or set policies.

In an embodiment, the container management system comprises a Kubernetes system, though all embodiments are not so limited. Other container management systems similar to Kubernetes may also be used, and specific reference to Kubernetes is meant to be primarily for example or illustration of possible embodiments.

FIG. 1 illustrates a container management system that includes a vulnerability tagging method, under some embodiments. As shown in FIG. 1, system 100, a number of applications (apps) are encapsulated in respective containers 102 so that each application operates within its own operating environment. The containers are deployed as portable, self-sufficient data structures that can run any practical hardware platform 108 from VMs, cloud clusters, servers, and so on. The multiple isolated containers are run on a single control host and access a single kernel 106 that provides access to certain Linux kernel features such as cgroups (control groups), namespaces, security enhancements (e.g., SELinux), and so on. In an embodiment, system 100 utilizes the Docker container format to abstract the lower layer of container technology, though other similar formats may also be used. An application can run in multiple containers, and usually a container will just run a single micro service.

The container management layer 104 is used to automate the creation, destruction, deployment and scaling of the containers 102. It includes a container orchestration process or component that arranges, coordinates and manages the containers. As the number and scale of the containers increases, certain orchestration tasks are required, such as service discovery, load balancing configuration, health checks, auto-scaling, zero-downtime deploys, and so on. Replication of container data is also key for critical enterprise tasks such as disaster recovery and data restoration.

Such disaster recovery and data restore applications typically involve a data backup system for backing up database data. One example is a Dell PowerProtect data management system that is a software defined data protection system including automated discovery, data deduplication, self-service and IT governance for physical, virtual and cloud environments. For this embodiment, system 100 may include a data management controller 110 coupled to or provided as part of the container management process 104. Although embodiments are described with respect to PowerProtect data management systems, and other related systems, such as Data Domain, it should be noted that embodiments are not so limited, and other similar platforms may also be used. To support certain vulnerability tagging processes, a vulnerability tagging component 110 is coupled to or provided as part of the container management process 104 or a data management controller function of the container management process.

In an embodiment, the container management layer 104 is implemented as a Kubernetes platform, which is an open-source platform for automating deployments, scaling, and operations of application containers across clusters of hosts, providing container-centric infrastructure. In a Kubernetes system, a cluster consists of at least one cluster master and multiple worker machines called nodes. A cluster is the foundation the system and the Kubernetes objects that represent the containerized applications all run on top of a cluster. In general, Kubernetes is an open-source container-orchestration system for automating application deployment, scaling, and management of containerized applications, and a Kubernetes cluster can run in the public cloud or on-premises and is designed to scale services on-demand.

Figure 2:
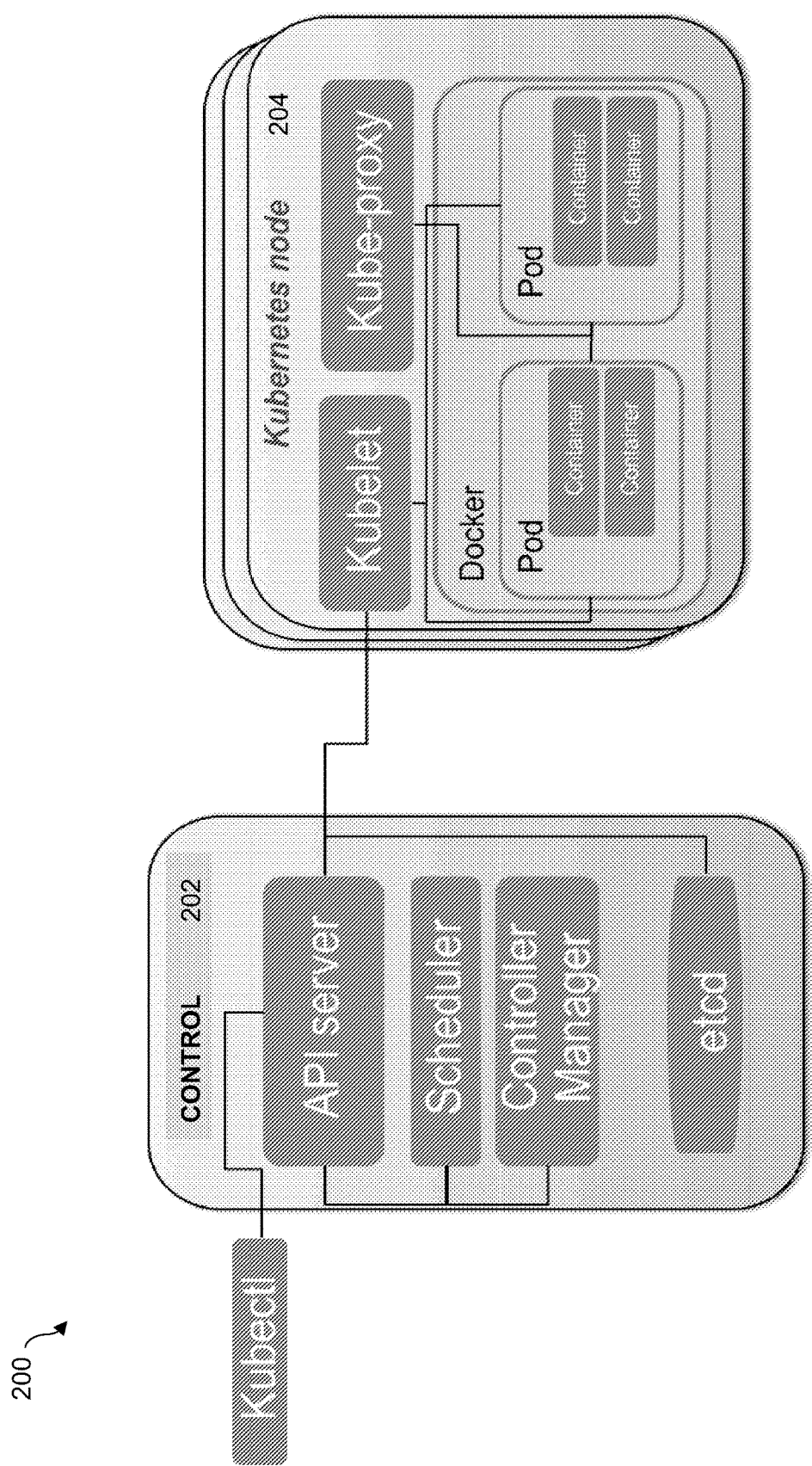
FIG. 2 is a block diagram that illustrates the architecture of a Kubernetes platform implementing a vulnerability tagging method, under some embodiments.

FIG. 2 is a block diagram 200 that illustrates the architecture of a Kubernetes platform implementing a vulnerability tagging process, under some embodiments. The controlling services in a Kubernetes cluster are called the control plane 202 components. These operate as the main management contact points for administrators, and also provide many cluster-wide systems for the relatively dumb worker nodes. These services can be installed on a single machine, or distributed across multiple machines. The servers running these components have a number of unique services that are used to manage the cluster's workload and direct communications across the system.

Within the control plane 202 is an API server that allows a user to configure many of Kubernetes' workloads and organizational units. It also is responsible for making sure that the etcd store (which stores configuration data to be used by the nodes) and the service details of deployed containers are in agreement. It acts as the bridge between various components to maintain cluster health and disseminate information and commands. The API server implements a RESTful interface, which means that many different tools and libraries can readily communicate with it. A client called kubecfg is packaged along with the server-side tools and can be used from a local computer to interact with the Kubernetes cluster.

The controller manager service is a general service that has many responsibilities. It is responsible for a number of controllers that regulate the state of the cluster and perform routine tasks. For instance, the replication controller ensures that the number of replicas defined for a service matches the number currently deployed on the cluster. The details of these operations are written to etcd, where the controller manager watches for changes through the API server. When a change is seen, the controller reads the new information and implements the procedure that fulfills the desired state. This can involve scaling an application up or down, adjusting endpoints, and so on.

The scheduler assigns workloads to specific nodes in the cluster. This is used to read in a service's operating requirements, analyze the current infrastructure environment, and place the work on an acceptable node or nodes. The scheduler is responsible for tracking resource utilization on each host (data source) to make sure that workloads are not scheduled in excess of the available resources. The scheduler must know the total resources available on each server, as well as the resources allocated to existing workloads assigned on each server.

In Kubernetes, servers that perform work are known as nodes 204. Node servers have a few requirements that are necessary to communicate with the control plane components 202, configure the networking for containers, and run the actual workloads assigned to them. The first requirement of each individual node server is docker. The docker service is used to run encapsulated application containers in a relatively isolated but lightweight operating environment. Each unit of work is, at its basic level, implemented as a series containers that must be deployed.

The main contact point for each node with the cluster group is through a small service called kubelet. This service is responsible for relaying information to and from the control plane services, as well as interacting with the etcd store to read configuration details or write new values. The kubelet service communicates with the control plane components to receive commands and work. Work is received in the form of a "manifest" which defines the workload and the operating parameters. The kubelet process then assumes responsibility for maintaining the state of the work on the node server. To allow individual host subnetting and make services available to external parties, a small proxy service is run on each node server. The proxy forwards requests to the correct containers, performs load balancing, and other functions.

While containers are used to deploy applications, the workloads that define each type of work are specific to Kubernetes. Different types of 'work' can be assigned. Containers themselves are not assigned to hosts. Instead, closely related containers (that should be controlled as a single 'application') are grouped together in a pod. This association leads all of the involved containers to be scheduled on the same host. They are managed as a unit and they share an environment so that they can share volumes and IP space, and can be deployed and scaled as a single application. Pods can be thought of as a single virtual computer and is the basic building block of Kubernetes and comprises one or more containers and share storage resources, and network resources. Pods run in a shared context and share the same IP using different port for containers.

With respect to data replication, a more complex version of a pod is a replicated pod. These are handled by a type of work unit known as a replication controller. A replication controller is a framework for defining pods that are meant to be horizontally scaled. The work unit is, in essence, a nested unit. A template is provided, which is basically a complete pod definition. This is wrapped with additional details about the replication work that should be done. The replication controller is delegated responsibility over maintaining a desired number of copies. This means that if a container temporarily goes down, the replication controller might start up another container. If the first container comes back online, the controller will kill off one of the containers.

In Kubernetes, source material is often expressed as a parameterized template. A tool processes the template by executing any embedded scripting and replaces parameters with desired values to generate a particular configuration. Different sets of values using the same template allow for convenient reuse of containers. One way to handle templates is with Helm, which is the package manager for Kubernetes, which includes templating capabilities and works at the application level to allow multiple manifests to be deployed together.

A Kubernetes organizational concept outside of the work-based units is labeling. A label is basically an arbitrary tag that can be placed on the above work units to mark them as a part of a group. These can then be selected for management purposes and action targeting. Labels are fundamental to the function of both services and replication controllers. Replication controllers give all of the containers spawned from their templates the same label. This makes it easy for the controller to monitor each instance. The controller or the administrator can manage all of the instances as a group, regardless of how many containers have been spawned.

Labels are given as key-value pairs. Each unit can have more than one label, but each unit can only have one entry for each key. Pods can be given a name key as a general purpose identifier, or they can be classified by various criteria such as development stage, public accessibility, application version, etc. In many cases, many labels can be assigned for fine-grained control. A user can then select based on a single or combined label requirements.

Data protection in large-scale database processing systems involves backing up large amounts of data at regular time intervals. A simple backup using a database dump operation (e.g., mysqldump), which is a logical export of the database system, sends output files as streams to a backup storage device, such as a Data Domain Appliance, or similar. This approach provides a single solution for all types of Kubernetes Persistent VolumeClaim (PVC) systems, and the same implementation is provided for all databases, and application consistency is provided by the database dump operation.

Vulnerability Tagging

In general, containers 102 can each suffer from some degree of vulnerability to data loss due to malware attack, data corruption, system failure, and so on. Different containers can feature different levels of vulnerability depending on storage location/type, data type, ownership, network association, and so on. Vulnerabilities can generally range from any number of conditions, either natural (incidental) or man-made (attacks) and can range from malware, hacking, data corruption, data theft, and so on, to system failures, such as hardware/software failures, disk failures, storage failures, OS failures (e.g., BSOD), writer failure for applications like SQL, Exchange, and so on. Additionally, vulnerabilities can consist of metadata compromises, index compromise, saveset compromise in the data protection infrastructure, network, cloud, etc. Vulnerabilities can also extend to data spoofing, credential breaches, network sniffing, or potential attacker posing as a known user to the network. These represent only some of the circumstances that may render the data system vulnerability to data compromise or loss, and many others may exist that similarly expose the system to data risk. The term 'vulnerability' thus refers to any circumstance or event that poses a risk to the integrity of the data processed and stored in the system.

As stated above, embodiments of system 100 of FIG. 1 include a vulnerability tagging component 110 as part of the container manager 104 that utilizes artificial intelligence (AI) to analyze events from each of the container through Kubernetes and give an analogous weighting to each of the events. This process calculates the number of occurrences of an event, and associates a vulnerability tag to a particular container to ensure that the workloads are backed up in advance of any possible problem based upon these tags. A tagging process is then used to tag (e.g., via metadata) a vulnerability level for each container.

Figure 3:
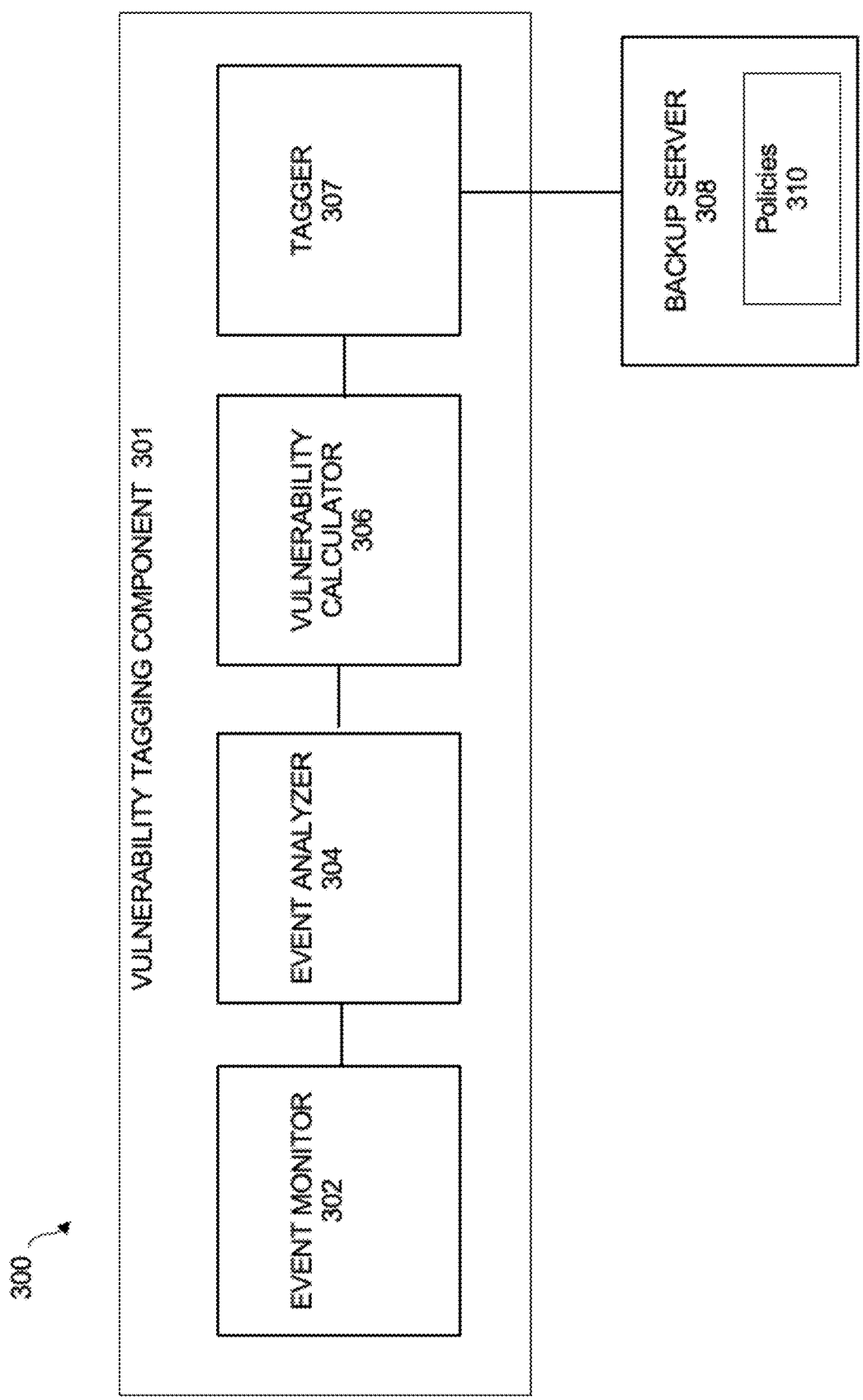
FIG. 3 illustrates components of a vulnerability tagging component, under some embodiments.

FIG. 3 illustrates components of a vulnerability tagging component 110, under some embodiments. System 300 of FIG. 3 includes an event monitor 302 that monitors the data protection system for the occurrence and characteristics of certain pre-defined events. All events from a host's native event viewer could be monitored on continuously on a regular basis (e.g., hourly, daily, weekly, etc.) to detect the occurrence of any issue or problem that represents a vulnerability to the containers. This can include monitoring an application's log metadata, a storage device's event logger, and so on. Any number and type of events may be defined and marked for monitoring. For example, monitored events could include continuous login events with multiple failures that look suspicious, BSOD failure events that are logged in the hosts, any space usage limitation breach or credential breach event, any malware or ransomware suspicion detection event, and so on.

The monitoring period can be defined by user input, system configuration, application parameter, and so on, and different events can be monitored at different times or a uniform polling period can be used. For example, the polling interval could be set by default to every 1 hour as a scheduled monitoring period. However, this can also be a user-tunable parameter that could be tuned to other values, such as every minute or once a day, and so on.

The monitored events are then processed by an event analyzer 304 to characterize each event in terms of a vulnerability measure. Such a measure can be expressed as a scalar value that quantifies the relative amount of risk or threat to the data, and thus the amount of vulnerability the data faces as a result of the event. Thus, in system 300, the containers are continuously monitored for events, and all the events are analyzed by an analysis engine 304. The final severity of each event is the given as a numerical weighting value. This value is multiplied by number of occurrences of the event from a stipulated time per container and a total vulnerability measure is calculated in a calculator component 306.

In an embodiment, the vulnerability calculator 306 calculates an integer value that represents a relative level of vulnerability posed by an event or number of same events to a container or containers. The vulnerability level or 'score' for an event may be provided on any appropriate scale, such as 1 to 10 or 1 to 100 with higher scores indicating greater vulnerability to data corruption or loss. Any appropriate weighting value may be used based on type of event, number of occurrences, importance of container data, and so on.

For example, a log-in event by authorized personnel may be assigned a relatively low base value with multiple repetitions allowed, whereas an unauthorized log-in may be assigned a higher base score, with each repeated attempt counted as a new event. Other defined events and occurrences may be analyzed similarly based on system configuration, risk patterns, and so on.

Once the events are analyzed and the vulnerability scores are calculated, the scores are tagged on the container workload by tagger 307. Generally, the tagger assigns the vulnerability as a numerical ranking, such as between 1 to 10, or any other value depending on the range of scoring. Alternatively, a qualitative textual ranking may be used instead of a numerical ranking, such as along a "Good-Minor-Medium-Serious-Bad" scale or color scale ("Blue-Green-Yellow-Orange-Red:), or any similar relative ranking scale.

In an embodiment, the tagger 307 appends the vulnerability score as metadata to the existing JSON (JavaScript Object Notation) payload of the host or data source information. For this embodiment, the JSON payload of the host includes a KEY named "VULNERABILITY_TAG" (or similar) which would have the value of rank from (e.g., from 1-10). This weightage indicates the amount of vulnerability measure for that host at that instant of time. In general, the format can be changed to tag the same to JSON, or CSV, or onto the Kubernetes payload using the Kubernetes API's. The metadata of the backup would have this information since the payload of the backed up data would also be present in the metadata. For example, if the vulnerability measure is ranked at 6, then the JSON would have metadata including: { . . . "VULNERABILITY_TAG": 6, . . . }.

In an embodiment, the vulnerability score can be added as payload information to the Kubernetes host payload that is being generated at the data protection software side, and is generally not part of the native Kubernetes code.

Besides this metadata approach, other mechanisms to append the calculated vulnerability score of an event to a container payload may also be used.

In an embodiment, the vulnerability tags are utilized by the backup (e.g., PPDM) server (or any other server) 308 to rearrange any applicable protection policies 310 as per their vulnerability factor or re-prioritize adhoc backup requests.

The backup policies 310 are generally a set of rules defined by the system and/or system administrator that dictate where and when data is copied from the container to a storage target. The policies set various parameters, such as backup priority, backup times, backup periods, min/max backup session durations, compression mechanisms, protection mechanisms (e.g., encryption, etc.), and the like. One or more of these parameters may be modified depending on the vulnerability tag associated with a container.

In an embodiment, backup priority is the first or main parameter that is modified by the vulnerability tags. In this manner, the priorities of the data assets to be protected can be dynamically altered to make sure that the most vulnerable data is protected first. In the case of identical priorities or vulnerability tags, a tie-breaker rule for ambiguous cases can be defined based on a configured policy. For example, such a rule could consider the number of protection points already existing on the asset from the policy and number of times, whether or not the policy level priority was downgraded if anytime, and so on. The backups would then be triggered for the most satisfying cases. In the process of this execution, preliminary execution cycles would take place in parallel for the assets in consideration until the final priority decision is made.

As an example of re-prioritization, consider a data workload with a high vulnerability rank (e.g., 8-10 on a scale of 1 to 10). This score would indicate that the data needs immediate attention, and would therefore be given high or immediate backup priority instead of waiting until its regularly scheduled or manually triggered protection cycle. Using the vulnerability tags as prioritization flags, the server 308 could automatically backup the most vulnerably threatened data first.

In an embodiment, the event analyzer component 304 of the vulnerability tagging component 301 utilizes certain artificial intelligence (AI) and machine learning (ML) processes to evaluate each event from different containers of the Kubernetes workload. Each event is analyzed with respect to the severity of the event and number of occurrences of the event within a defined period of time.

The severity measure represents a vulnerability score that is based upon a consequence of the event on the system. Example system impacts include full storage space utilization, maximum CPU utilization, potential system crashes, and so on. Any such occurrence can be or lead to a serious system failure, or failure of the backup process.

Figure 4:
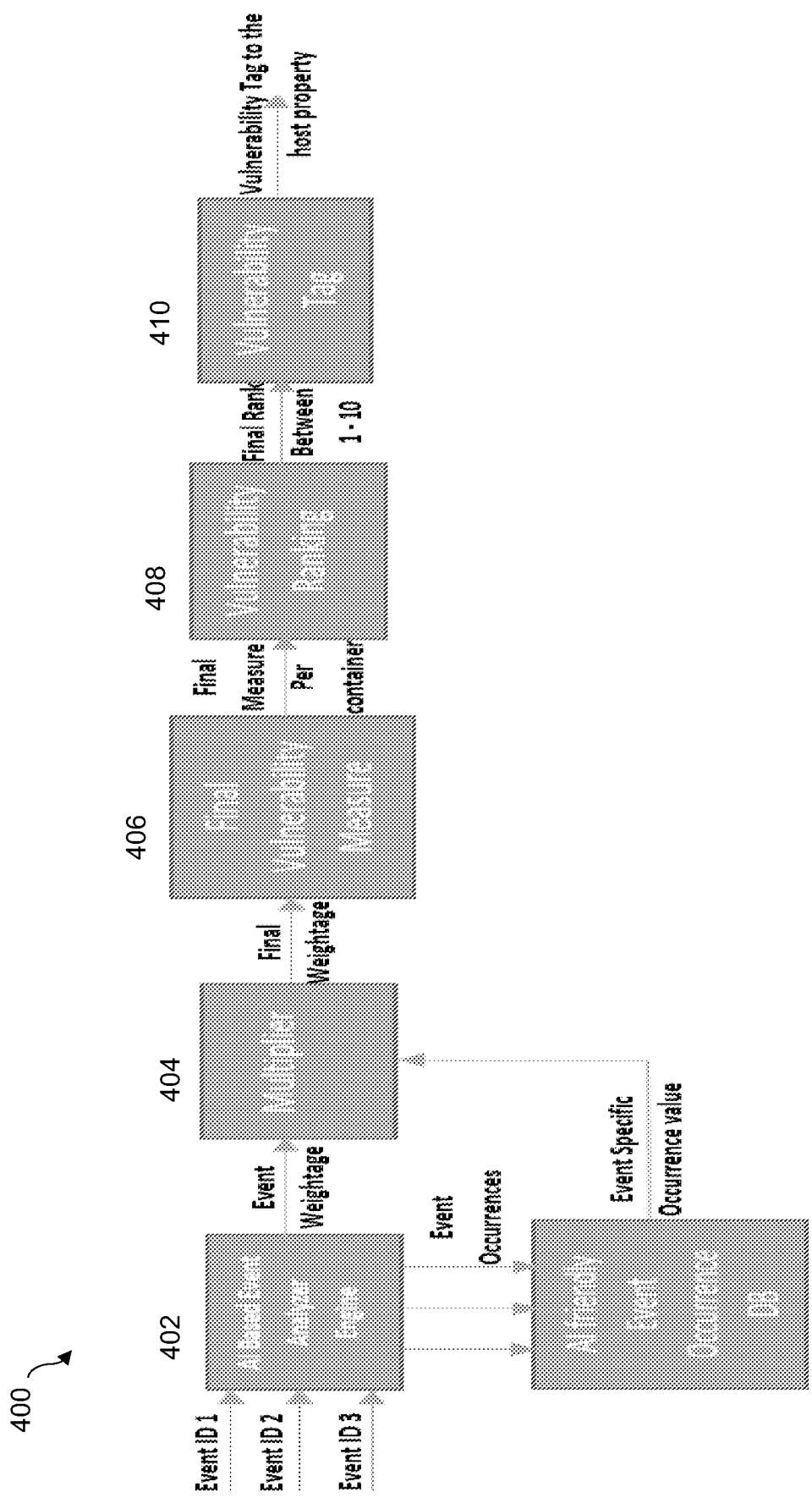
FIG. 4 illustrates an AI-based event analyzer engine, under some embodiments.

FIG. 4 illustrates an AI-based event analyzer engine, under some embodiments. As shown in system 400 of FIG. 4, a number of events each indexed by a respective identifier (ID n), and as monitored by event monitor 302, are input to an AI-based event analyzer engine 402. The number of occurrences of each event is recorded in an occurrence database 412 against the event ID respectively from their container. The number of occurrences is a simple count of event instances during a defined period of time, typically based on the event type. For example, user logins can be tracked on the order of seconds or minutes, while system crashes can be tracked on the order of hours or days, and so on.

The analyzer engine 402 associates a severity value with each event based on a defined schedule as compiled for known events and attack or corruption patterns. For example, malware attacks can be assigned the highest severity (e.g., 10) while login events may be assigned a severity value of 0 to 2, and so on.

With respect to how severity levels or values are assigned based on known activities in the analyzer engine, in an embodiment, the system uses pre-defined tables, dictionaries or any other similar data structure depending upon implementation constraints and preferences. For example, if a half analytical model is implemented, a dictionary could be used with a pre-defined set of events and severity values based upon the application or end user for which or whom the appliance is being used. In a fully analytical or AI-based model instead, a huge data set can be trained for heterogeneous events and distinct values in different use cases and scenarios. Other implementations or combinations of defined tables and ML-based methods can also be used.

The severity value combined with the number of occurrences per event comprises a weighting value that is then input to a multiplier 404, which produces the product of these values. In an embodiment, the 'event weightage' is a scalar value indicating the amount of vulnerability measure for that host at a particular instant of time.

This product is then routed to the final vulnerability measure process 406, where the values would be stored against their events and their hosts. The final measure per container would be a mean value of the number of events and the product from the multiplier 404. The vulnerability ranking 408 is the analogous rank against the final measure per container along a defined scale, such as rank 1 to 10, with rank 1 being the least and rank 10 being the highest and most vulnerable, for example. The same would be tagged on each host payload on the backup server using the vulnerability tag. It should be noted that such a range is provided for example only, and any other suitable range or ascending or descending order may be used.

As described above, the vulnerability tag can be added as a feature to tag the Kubernetes workloads with the appropriate the vulnerability measure based on events associated with the workloads. The dynamic tagging of the hosts uses the events as a measure of backup priority and policy application, rather than just the application type. Through this feature, the backup server would be able to dynamically rearrange the most vulnerable items to be protected first and if required on an adhoc basis. This can help the users to achieve better recovery point objective (RPOs) and define stronger service level agreements (SLAs) on the server.

Figure 5:
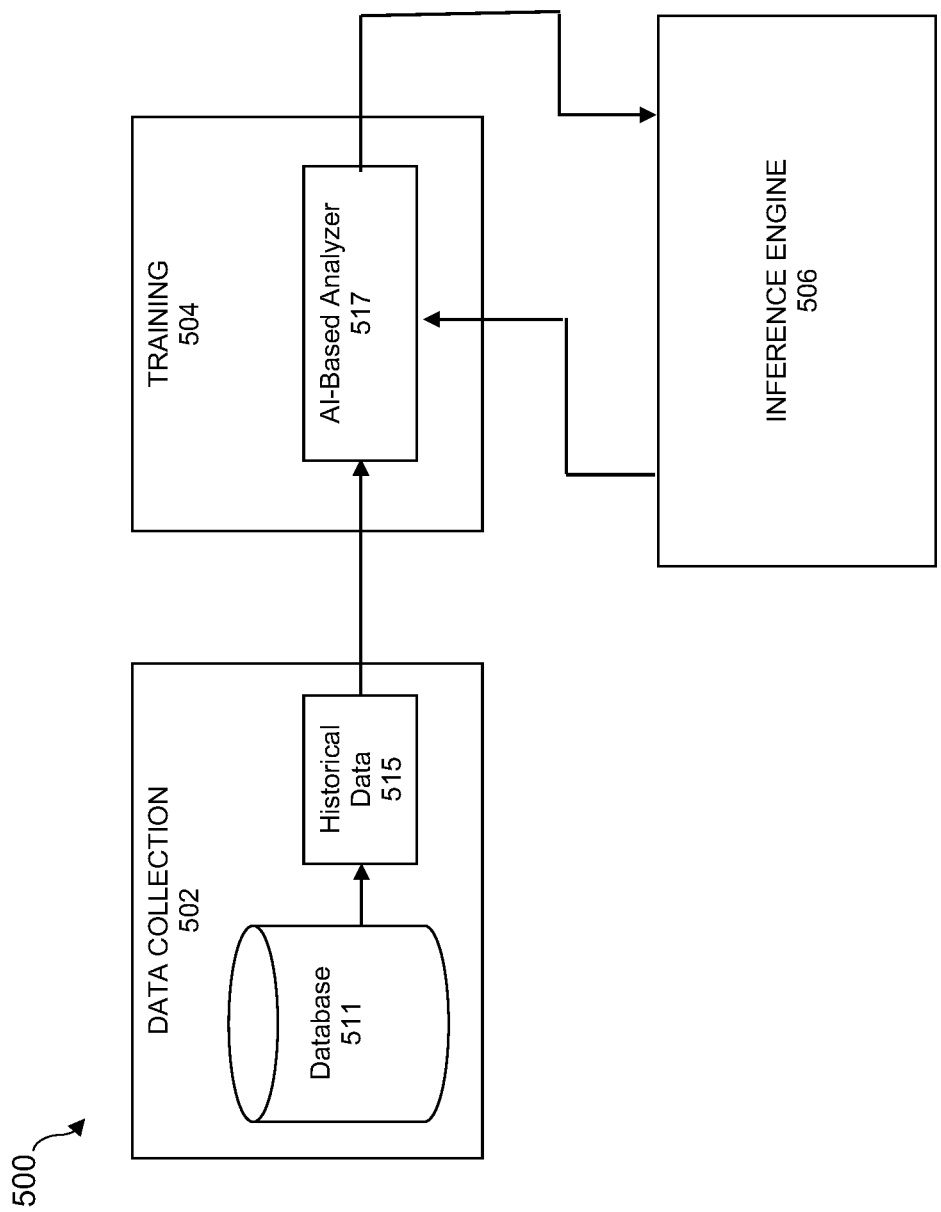
FIG. 5 illustrates a general AI/ML component used in an event analyzer engine, under some embodiments.

As shown in FIG. 4, the analyzer engine utilizes certain AI and/or ML processes. Such a process generally uses a training component that continuously trains a machine learning algorithm to identify the events, relevant connections between events, and other applicable information to thereby determine severity of the events. FIG. 5 illustrates a general AI/ML component used in an event analyzer engine, under some embodiments. System 500 of FIG. 5 includes a data collection component 502, a training component 504, and an inference component 506. The data collection component 502 can comprise various data loggers and I/O capture devices and databases 511 along with a body of historical information 515 about past events. The data collection component 502 continuously monitors and collects event data to build up its database. This collected information is submitted to the training component 504 through an AI-based analyzer 517. This component continuously trains a machine learning algorithm to identify the events and potential damaging consequences of these events to thereby determine a correlation of events to vulnerabilities of the data. The inference engine 506 also continuously trains the AI/ML algorithms through monitored events.

The AI component of system 500 may employ any suitable AI algorithm, such as KNN or RNN, or similar algorithm. In general, the performance required to handle the vast variation of data source types and huge size of the big data involved, which may be in zeta bytes of range, may be achieved with low latency and high throughput through embodiments described herein. Furthermore, through these AI processes, the decisions to tag the workload as vulnerable is real-time and near fully 100% accurate. Such AI mechanisms may be scaled and modified for different application needs and system configurations.

Figure 6:
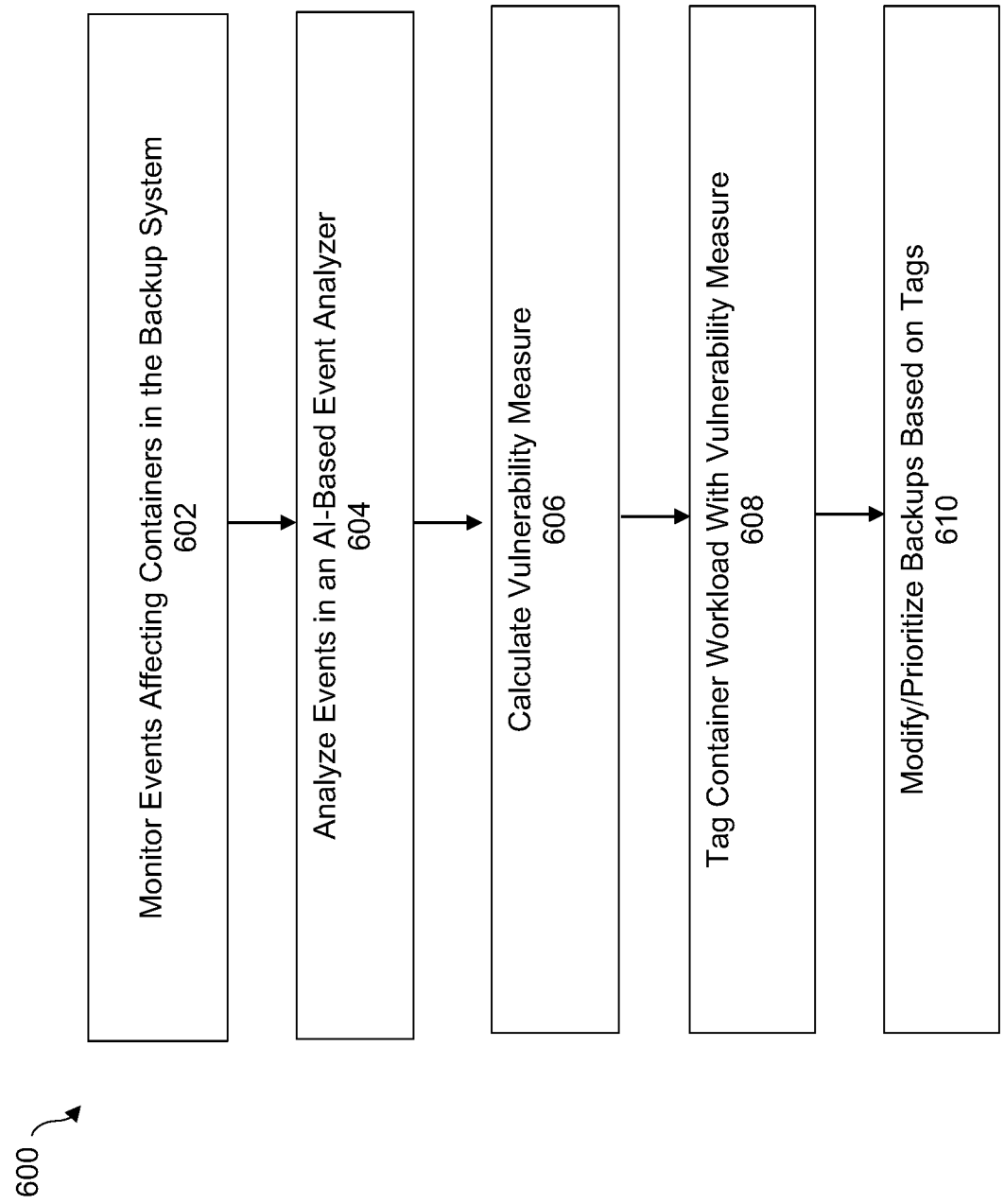
FIG. 6 is a flowchart illustrating a process of vulnerability tagging, under some embodiments.

FIG. 6 is a flow diagram illustrating a vulnerability tagging process, under some embodiments. Process 600 of FIG. 6 begins with monitoring events that affect containers in the data protection system, 602. The monitored events are then processed by an AI-based event analyzer to characterize each event in terms of a potential for destruction or damage to the data by each event. The process then calculates 606 the vulnerability measure as the product of the number of occurrences of each event based on the severity associated with each event. Once the events are analyzed and the vulnerability scores are calculated, the scores are tagged on the container workload by a tagger, 608. The vulnerability tags can then be utilized by the backup server (or any other server) to modify protection policies and/or prioritize backup schedules for the container workloads, 610.

Figure 7:
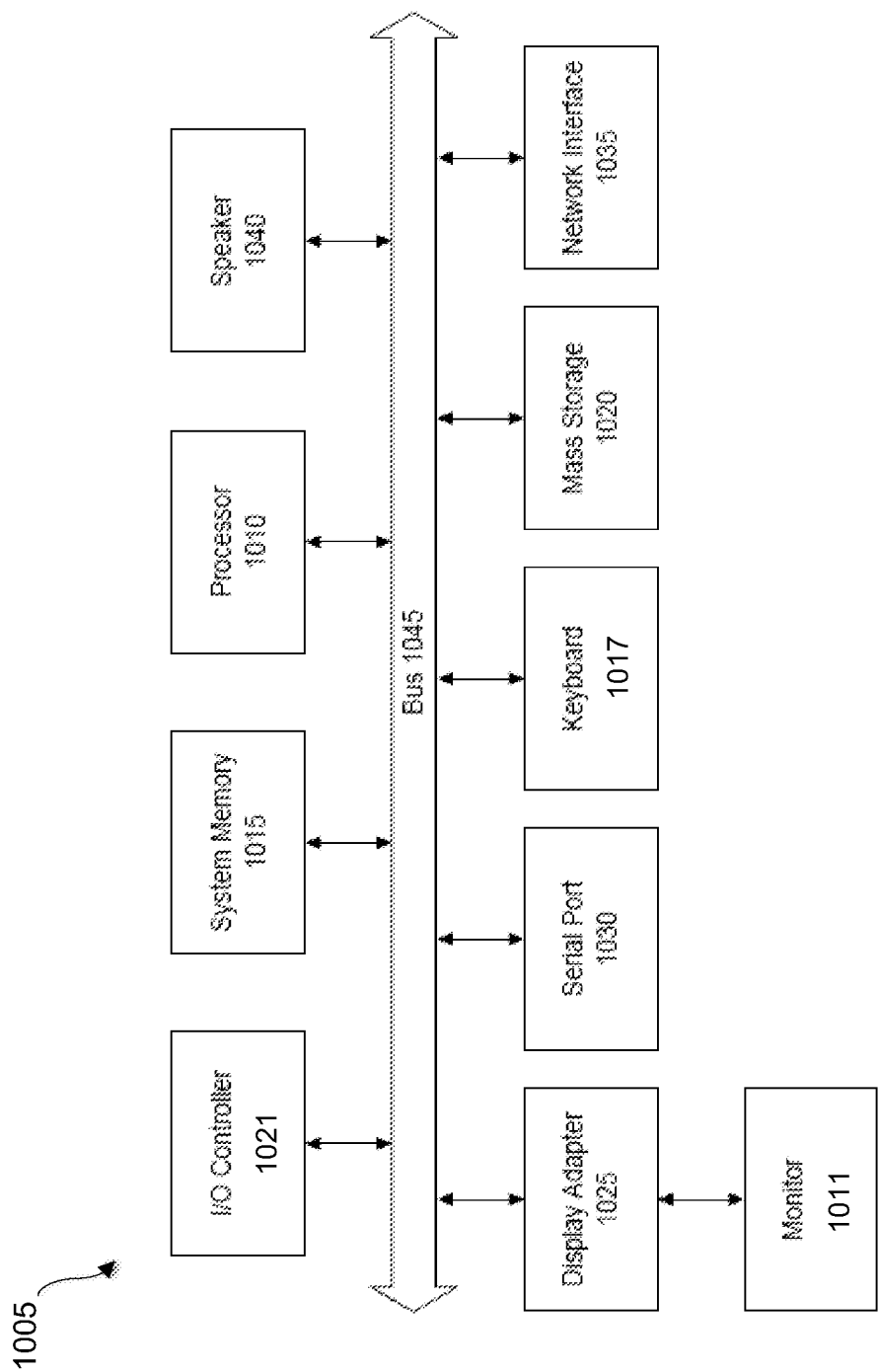
FIG. 7 shows a system block diagram of a computer system used to execute one or more software components of the present system described herein.

The system of FIG. 1 may comprise any number of computers or computing devices in client-server networks including virtual machines coupled over the Internet or similar large-scale network or portion thereof. Each processing device in the network or container system may comprise a computing device capable of executing software code to perform the processing steps described herein. FIG. 7 is a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11x), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer-implemented method of dynamically prioritizing backups of datasets in a network, comprising:
defining one or more protection policies to back up the datasets according to a defined prioritization;
monitoring events that affect data of a dataset to be protected by the one or more protection policies;
processing the monitored events in an event analyzer to characterize each event in terms of a severity of potential damage to the data by each event;
calculating a vulnerability measure for a dataset as the product of the number of occurrences of each event based on the severity associated with each event;
assigning a numerical score to the calculated vulnerability measure;
tagging the score as metadata to a payload of the dataset; and
using the score to modify the defined prioritization for backing up the dataset in the one or more protection policies to accommodate a vulnerability of the dataset as indicated by the vulnerability measure.

2. The method of claim 1 further comprising re-prioritizing an ad-hoc backup request within a series of backup requests managed by the one or more protection policies.

3. The method of claim 2 wherein the network comprises a PowerProtect Data Domain deduplication backup system.

4. The method of claim 1 wherein the data is containerized data managed by a container management process.

5. The method of claim 4 wherein the network comprises a Kubernetes cluster having a controller, an application program interface (API) server, and a data migration process performing the data protection.

6. The method of claim 5 wherein the payload comprises a JavaScript Object Notation (JSON) payload.

7. The method of claim 6 wherein the tag is implemented as an alphanumeric string appended to an existing payload of the dataset having data source information.

8. The method of claim 7 wherein the tag comprises a key value having a format of "VULNERABILITY_TAG" with an associated scalar value, wherein the associated value represents a severity level of a corresponding event ranked along a defined scale, and wherein the defined scale is on the order of 1 to 10, in one of ascending or descending order of severity.

9. The method of claim 8 wherein the tag is associated with a Kubernetes payload of the dataset using a Kubernetes application programming interface (API).

10. The method of claim 1 wherein the event analyzer is an artificial intelligence (AI) based event analyzer.

11. The method of claim 10 wherein the event analyzer comprises a data collection component, a training component, and an inference component, and contains historical information regarding events of the network to continuously train a machine learning (ML) algorithm to identify events and potential damaging consequences of the events to correlate events to vulnerabilities of the data.

12. A system for dynamically prioritizing backups of datasets in a network, comprising:
a backup server executing one or more protection policies to back up the datasets according to a defined prioritization;
a hardware-based monitor monitoring events that affect data of a dataset to be protected by the one or more protection policies;
an event analyzer processing the monitored events to characterize each event in terms of a severity of potential damage to the data by each event;
a hardware-based calculator calculating a vulnerability measure for a dataset as the product of the number of occurrences of each event based on the severity associated with each event and assigning a numerical score to the calculated vulnerability measure; and
a tagger tagging the score as metadata to a payload of the dataset, wherein the backup server uses the score to modify the defined prioritization for backing up the dataset in the one or more protection policies to accommodate a vulnerability of the dataset as indicated by the vulnerability measure.

13. The system of claim 12 wherein the backup server comprises a PowerProtect Data Domain deduplication backup server, and wherein the data is containerized data managed by a container management process, and further wherein the network comprises a Kubernetes cluster having a controller, an application program interface (API) server, and a data migration process implementing the protection policies.

14. The system of claim 13 wherein the tag is implemented as an alphanumeric string appended to an existing payload of the dataset having data source information, and further wherein the payload comprises a JavaScript Object Notation (JSON) payload.

15. The system of claim 14 wherein the tag comprises a key value having a format of "VULNERABILITY_TAG" with an associated scalar value, wherein the associated value represents a severity level of a corresponding event ranked along a defined scale, and wherein the defined scale is on the order of 1 to 10, in one of ascending or descending order of severity.

16. The system of claim 15 wherein the tag is associated with a Kubernetes payload of the dataset using a Kubernetes application programming interface (API).

17. The system of claim 16 wherein the event analyzer is an artificial intelligence (AI) based event analyzer.

18. The system of claim 17 wherein the event analyzer comprises a data collection component, a training component, and an inference component, and contains historical information regarding events of the network to continuously train a machine learning (ML) algorithm to identify events and potential damaging consequences of the events to correlate events to vulnerabilities of the data.

19. A tangible computer program product having stored thereon program instructions that, when executed by a process, cause the processor to perform a method of prioritizing data assets for data protection operations in a data protection system, comprising:
defining one or more protection policies to back up the datasets according to a defined prioritization;
monitoring events that affect data of a dataset to be protected by the one or more protection policies;
processing the monitored events in an event analyzer to characterize each event in terms of a severity of potential damage to the data by each event;
calculating a vulnerability measure for a dataset as the product of the number of occurrences of each event based on the severity associated with each event;

assigning a numerical score to the calculated vulnerability measure;

tagging the score as metadata to a payload of the dataset; and using the score to modify the defined prioritization for backing up the dataset in the one or more protection policies to accommodate a vulnerability of the dataset as indicated by the vulnerability measure.

20. The product of claim 1 wherein the method further comprises re-prioritizing an ad-hoc backup request within a series of backup requests managed by the one or more protection policies.

\* \* \* \* \*